United States Patent [19]
Wu et al.

[11] Patent Number: 6,110,582
[45] Date of Patent: Aug. 29, 2000

[54] SUBSTANTIALLY TWO DIMENSIONAL ISOTROPIC MAGNETIC RECORDING MEDIUM COMPRISING A NIAL UNDERLAYER

[75] Inventors: Zhong Wu, Fremont; Rajiv Y. Ranjan, San Jose, both of Calif.

[73] Assignee: Seagate Technology, Inc., Scotts Valley, Calif.

[21] Appl. No.: 09/149,096

[22] Filed: Sep. 8, 1998

Related U.S. Application Data

[60] Provisional application No. 60/058,238, Sep. 8, 1997.

[51] Int. Cl.$^7$ ........................................................ G11B 5/66
[52] U.S. Cl. ...................... 428/332; 428/336; 428/694 T; 428/694 TS; 428/900; 427/128; 427/129; 427/130; 427/131; 204/192.2
[58] Field of Search .......................... 423/694 T, 694 TS, 423/900, 332, 336; 427/128–131; 204/192.2

[56] References Cited

U.S. PATENT DOCUMENTS

| | | | |
|---|---|---|---|
| 5,733,370 | 3/1998 | Chen | 117/105 |
| 5,879,783 | 3/1999 | Chang | 428/141 |
| 6,010,795 | 1/2000 | Chen | 428/611 |

OTHER PUBLICATIONS

Lee "NiAl Underlayers . . . ", IEE Transactions on Magnetics vol. 30, No. 6, Nov. 1996.

"NiAl Underlayers for CoCrTa Magnetic Thin Films", Li–Lien Lee et al., IEEE Transactions of Magnetics, vol. 30, No. 6, Nov. 1994.

"Effects of Cr Intermediate Layers on CoCrPt Thin Film Media on NiAl Underlayers", Li–Lien Lee, et al., IEEE Transactions on Magnetics, vol. 31, No. 6, Nov. 1995.

"Seed Layer Induced (002) Crystallographic Texture in NiAl Underlayers", Li–Lien Lee, et al., Journal of Applied Pysics, vol. 79, No. 8, Apr. 15, 1996.

The Control and Characterization of the Crystallographic Texture of Longitudinal Thin Film Recording Media, David E. Laughlin, et al., IEEE Transactions on Megnetics, vol. 32, No. 5, Sep. 1996.

"41$^{st}$ Annual Conference on Magnetism and Magnetic Materials–Abstracts", Nov. 12–15, 1996.

*Primary Examiner*—Leszek Kiliman
*Attorney, Agent, or Firm*—McDermott, Will & Emery

[57] ABSTRACT

A high areal density magnetic recording medium exhibiting high $H_c$, high SNR, high S* and substantially two dimensionally isotropic magnetic properties is achieved by depositing a NiAl underlayer on a NiP-plated non-magnetic metallic substrate, such as an Al alloy substrate. Embodiments include depositing a Cr layer on the NiAl underlayer. The NiAl underlayer and/or Cr layer can optionally contain an alloying element for inducing a preferred HCP crystallographic structure in the magnetic layer by lattice matching.

23 Claims, 6 Drawing Sheets

SUBSTANTIALLY TWO DIMENSIONAL ISOTROPIC MAGNETIC RECORDING MEDIUM COMPRISING A NIAL UNDERLAYER

RELATED APPLICATIONS

This application claims priority from provisional patent application Ser. No. 60/058,238, filed Sep. 8, 1997, entitled "New Underlayer Design For Smooth Substrates of Longitudinal Recording Media", the entire disclosure of which is hereby incorporated herein by reference.

This application contains subject matter similar to subject matter in copending application Ser. No. 09/145,762, filed on Sep. 2, 1998 now pending.

TECHNICAL FIELD

The present invention relates to a magnetic recording medium, such as a thin film magnetic recording disk, and to a method of manufacturing the medium. The invention has particular applicability to a high areal density magnetic recording media exhibiting low noise, high coercivity and high overwrite.

BACKGROUND ART

The requirements for high areal recording density impose increasingly greater requirements on thin film magnetic recording media in terms of coercivity, remanent squareness, low medium noise and narrow track recording performance. It is extremely difficult to produce a magnetic recording medium satisfying such demanding requirements, particularly a high density magnetic rigid disk medium.

The linear recording density can be increased by increasing the coercivity of the magnetic recording medium. However, this objective can only be accomplished by decreasing the medium noise, as by maintaining very fine magnetically noncoupled grains. Medium noise, typically measured as the signal to noise ratio (SNR), is a dominant factor restricting increased recording density of high density magnetic hard disk drives. Medium noise in thin films is attributed primarily to inhomogeneous grain size and intergranular exchange coupling. Therefore, in order to increase linear density, medium noise must be minimized by suitable microstructure control.

A conventional longitudinal recording disk medium is depicted in FIG. 1 and typically comprises a non-magnetic substrate 10 having sequentially deposited thereon an underlayer 11, such as chromium (Cr) or a Cr-alloy, a magnetic layer 12, typically comprising a cobalt (Co) alloy, a protective overcoat 13, typically containing carbon, and a lubricant topcoat 14. Underlayer 11, magnetic layer 12 and protective overcoat 13 are typically deposited by sputtering techniques. The Co alloy magnetic layer normally comprises polycrystallites epitaxially grown on the polycrystal Cr or Cr-alloy underlayer.

It is recognized that the relevant magnetic properties, such as coercivity (Hc), magnetic remanence (Mr) and coercive squareness (S*), which are critical to the performance of a Co base alloy magnetic thin film, depend primarily on the microstructure of the magnetic layer which, in turn, is influenced by the underlayer on which it is deposited. Conventional underlayers include Cr, molybdenum (Mo), tungsten (W), titanium (Ti), chromium-vanadium (CrV) as well as Cr alloyed with various substitutional elements. It is recognized that underlayers having a fine grain structure are highly desirable, particularly for growing fine grains of hexagonal close packed (HCP) Co alloys deposited thereon.

It has been reported that nickel-aluminum (NiAl) films on a glass substrate exhibit a grain size which is smaller than similarly deposited Cr films which are the underlayer of choice in producing conventional magnetic recording media. Li-Lien Lee et al., "NiAl Underlayers For CoCrTa Magnetic Thin Films", IEEE Transactions on Magnetics, Vol. 30, No. 6, pp. 3951–3953, 1994.

Accordingly, NiAl thin films are potential candidates as underlayers for magnetic recording media for high density longitudinal magnetic recording. Such a magnetic recording medium is schematically illustrated in FIG. 2 and comprises glass substrate 20, NiAl underlayer 21 and cobalt alloy magnetic layer 22 (protective overcoat and lubricant topcoat omitted for illustrative convenience). However, it was found that the coercivity of a magnetic recording medium comprising an NiAl underlayer, such as that depicted in the FIG. 2, is too low for high density recording, e.g. about 2,000 oersteds (Oe).

Lee et al. subsequently reported that the coercivity of a magnetic recording medium comprising a glass substrate and an NiAl underlayer can be significantly enhanced by depositing a plurality of underlayers containing alternative NiAl and Cr layers rather than a single NiAl underlayer. Li-Lien Lee et al., "Effects of Cr Intermediate Layers on CoCrPt Thin Film Media on NiAl Underlayers," Vol. 31, No. 6, Nov. 1995, pp. 2728–2730. Such a magnetic recording medium comprising an alternative NiAl layer and Cr layer composite structure is schematically illustrated in FIG. 3.

Adverting to FIG. 3, the depicted magnetic recording medium comprises glass substrate 30 having sequentially formed thereon Cr sub-underlayer 31, NiAl underlayer 32, Cr intermediate layer 33, and Co alloy magnetic layer 34 (protective overcoat and lubricant topcoat omitted for illustrative convenience). It was found, however, that such a magnetic recording medium is characterized by an underlayer structure exhibiting a (110)-dominant crystallographic orientation which does not induce the preferred (11$\bar{2}$0)-dominant crystallographic orientation in the subsequently deposited Co alloy magnetic layer and is believed to contribute to increased media noise. Li-Lien Lee et al. were able to obtain an underlayer exhibiting a (200)-dominant crystallographic orientation by initially depositing a Cr sub-underlayer directly on the non-magnetic substrate at an undesirably high temperature of about 260° C. using radio frequency (RF) sputtering. However, deposition of a Cr sub-underlayer at such an elevated temperature undesirably results in significantly larger grains than grains resulting from deposition at lower temperatures, e.g. approximating room temperature (25° C.). The formation of such larger grains is inconsistent with the very reason for employing NiAl as an underlayer. On the other hand, it is very difficult to obtain a Cr (200)-dominant crystallographic orientation, even at elevated temperature such as 260° C., on glass and glass ceramic substrates using direct current (DC) magnetron sputtering, which is widely employed in the magnetic recording media industry.

Li-Lien Lee et al. recognized the undesirability of resorting to high deposition temperatures to obtain a (200)-dominant crystallographic orientation in the underlayer structure. It was subsequently reported that an underlayer structure exhibiting a (200)-dominant crystallographic orientation was obtained by depositing a magnesium oxide (MgO) seedlayer using radio frequency (RF) sputtering. Li-Lien Lee et al., "Seed layer induced (002) crystallographic texture in NiAl underlayers," J. Appl. Phys. 79 (8), Apr. 15, 1996, pp. 4902–4904; and David E. Laughlin et al., "The Control and Characterization of the Crystallographic Texture of the Longitudinal Thin Film Recording Media," IEEE Transactions on Magnetics, Vol. 32, No. 5, September 1996, pp. 3632–3637. Such a magnetic recording medium comprising a MgO seedlayer and NiAl underlayer is schematically illustrated in FIG. 4 and comprises MgO seedlayer 41 deposited on substrate 40, NiAl underlayer 42 deposited on MgO seedlayer 41, and Co alloy magnetic layer 43 deposited on NiAl underlayer 42 (protective overcoat and lubricant topcoat omitted for illustrative convenience). Such a magnetic recording medium, however is not commercially viable from an economic standpoint, because sputtering systems in place throughout the industry making magnetic recording media with the conventional structure of magnetic layers epitaxially formed on underlayers are based upon direct current (DC) sputtering. Accordingly, RF sputtering an MgO seedlayer is not economically viable.

On the other hand, the objective of having a (200)-dominant crystallographic orientation in the underlayers is to induce ($11\bar{2}0$) crystallographic orientation in the Co alloy layers. Even through media comprising an MgO seedlayer and NiAl underlayer have a (200)-dominant crystallographic orientation in the underlayer, it does not have a ($11\bar{2}0$)-dominant crystallographic orientation in the Co alloy layer, according to Laughlin et al., "The Control and Characterization of the Crystallographic Texture of the Longitudinal Thin Film Recording Media," IEEE Transaction on Magnetics, Vol. 32, No. 5, September 1996, p. 3634. Laughlin et al. reported that the grain-to-grain epitaxial relationship between the (002) NiAl and the CoCrPt film is found to be [$10\bar{1}1$] CoCrPt//[001] NiAl, and ($12\bar{1}0$) CoCrPt//(100) NiAl, or ($12\bar{1}0$) CoCrPt//(010) NiAl. In other words, Laughlin et al. reported that there is no ($11\bar{2}0$) CoCrPt//(200) NiAl epitaxial relationship found in the films with MgO seedlayers and NiAl underlayers. Rather, (200) orientation is identical with (002) orientation. When an FeAl underlayer is used instead of NiAl, it was reported that the (200) FeAl underlayer can only induce a weak ($11\bar{2}0$) textured CoCrPt by employing a MgO seedlayer or a (200) textured Cr seedlayer. Li-Lien Lee et al., "FeAl underlayers for CoCrPt thin film longitudinal media," CC-01, 41st Annual Conference on Magnetism and Magnetic Materials, Atlanta, Ga., Nov. 12–15, 1996.

In copending application Ser. No. 08/945,084, filed on Oct. 17, 1997 now U.S. Pat. No. 6,010,785, a magnetic recording medium is disclosed which comprises a surface oxidized NiP seedlayer, a Cr sub-underlayer thereon, a NiAl or FeAl underlayer formed on the sub-underlayer and a Cr or Cr alloy intermediate layer formed on the underlayer.

There exists a continuing need for high areal density magnetic recording media exhibiting a high signal to noise ratio (SNR) and high coercivity. There is a further continuing need for such magnetic recording media which exhibit improved overwrite properties and reduced modulation of magnetic properties, and are characterized by the absence of any substantial superlinear noise behavior at high areal recording densities.

DISCLOSURE OF THE INVENTION

An object of the present invention is a magnetic recording medium for high areal recording density exhibiting low noise, high coercivity and substantial directional magnetic isotropy.

Another object of the present invention is a magnetic recording medium which exhibits excellent overwrite properties, little or no modulation of magnetic properties and is characterized by the absence of any substantial superlinear noise behavior at high areal recording densities.

Another object of the present invention is a method of manufacturing a magnetic recording medium for high areal recording density exhibiting low noise, high coercivity and substantial directional magnetic isotropy.

Another object of the present invention is a method of manufacturing a magnetic recording medium which exhibits excellent overwrite properties, little or no modulation of magnetic properties and is characterized by the absence of any substantial superlinear noise behavior at high areal recording densities.

Additional objects, advantages and other features of the invention will be set forth in part in the description which follows and in part will become apparent to those having ordinary skill in the art upon examination of the following only to be learned from the practice of the invention. The objects and advantages of the invention may be realized and obtained as particularly pointed out in the appended claims.

According to the present invention, the foregoing and other objects are achieved, in part by a magnetic recording medium comprising: a non-magnetic substrate having a nickel-phosphorous plating thereon; a nickel-aluminum underlayer on the nickel-phosphorous plated nonmagnetic metallic substrate; and a magnetic layer on the underlayer; wherein the magnetic layer exhibits substantial directional magnetic isotropy. Embodiments include a Cr-containing underlayer, e.g., an alloy of Cr with elements such as V, Mo, W, Mn, Ti on the NiAl underlayer, and the magnetic layer on the Cr-containing underlayer.

Another aspect of the present invention is a method of manufacturing a magnetic recording medium, which method comprises: depositing a nickel-aluminum underlayer on a non-magnetic metallic substrate having a nickel-epitaxially growing a magnetic layer on the nickel-aluminum underlayer such that the magnetic layer exhibits substantial directional magnetic isotropy.

Additional objects and advantages of the present invention will become readily apparent to those skilled in this art from the following detailed description, wherein only the preferred embodiment of the invention is shown and described, simply by way of illustration of the best mode contemplated for carrying out the invention. As will be realized, the invention is capable of other and different embodiments, and its details are capable of modifications in various obvious respects, all without departing from the invention. Accordingly, the drawings and description are to be regarded as illustrative in nature, and not as restrictive.

DESCRIPTION OF THE INVENTION

Figure 1:
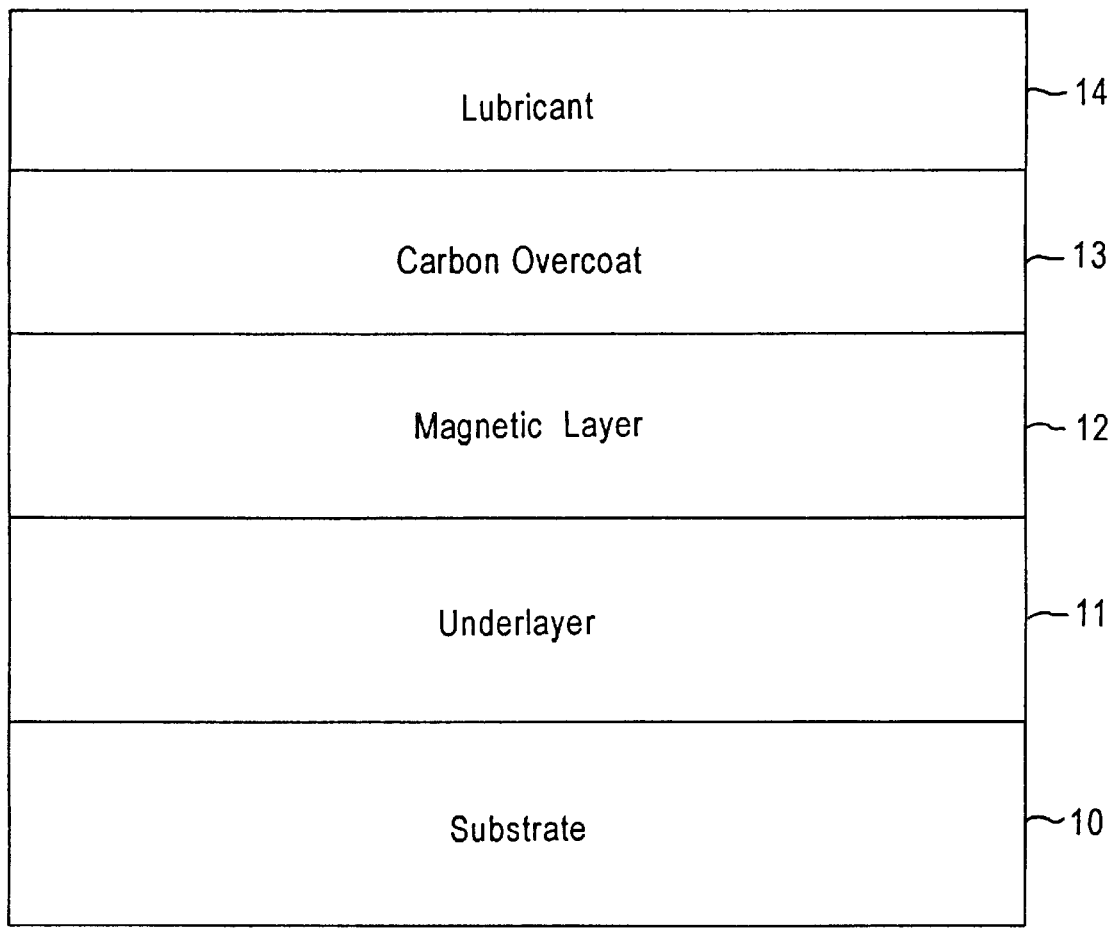
FIG. 1 schematically depicts a conventional magnetic recording medium structure.
Figure 2:
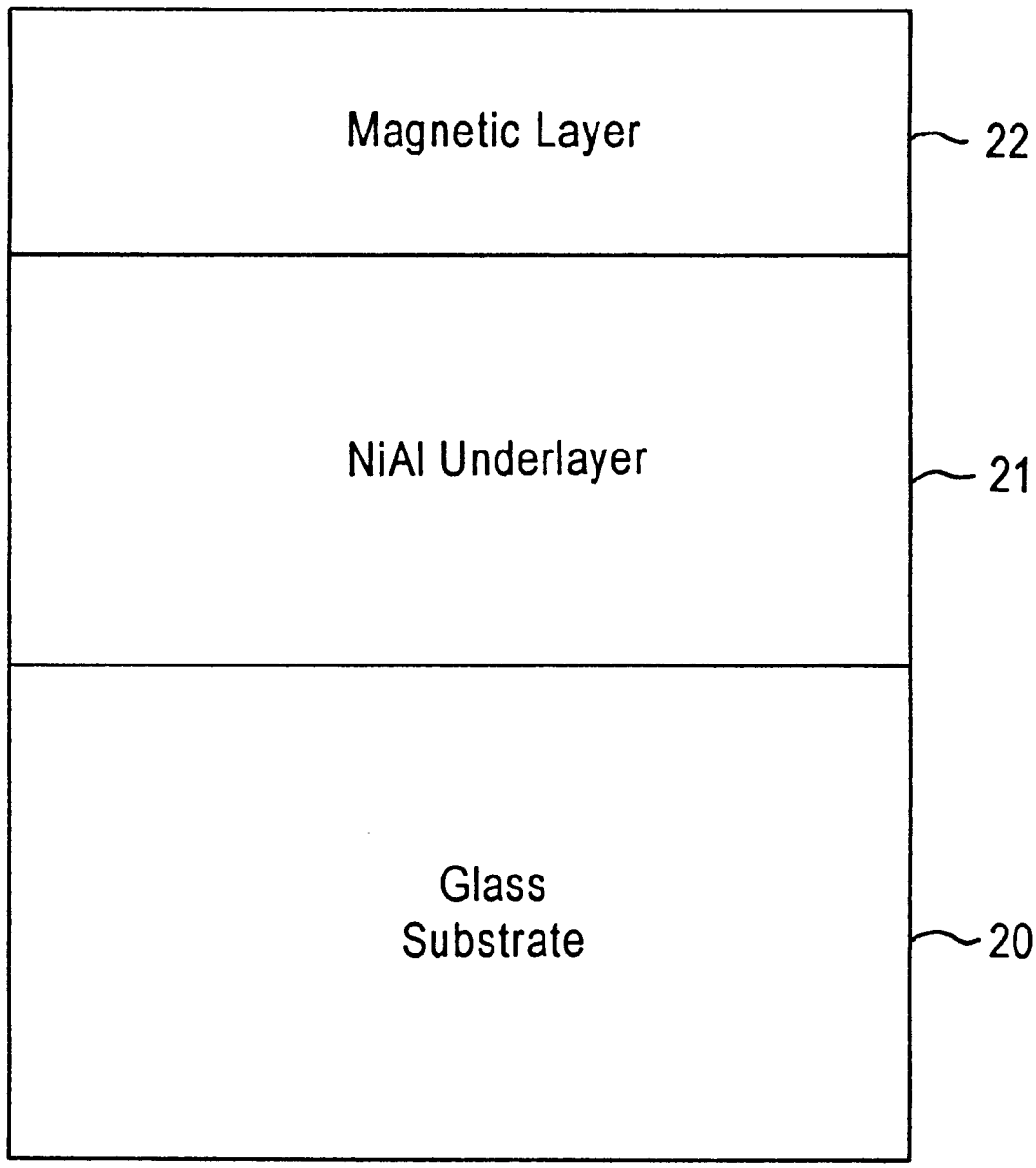
FIG. 2 schematically depicts a prior art magnetic recording medium containing an NiAl underlayer.
Figure 3:
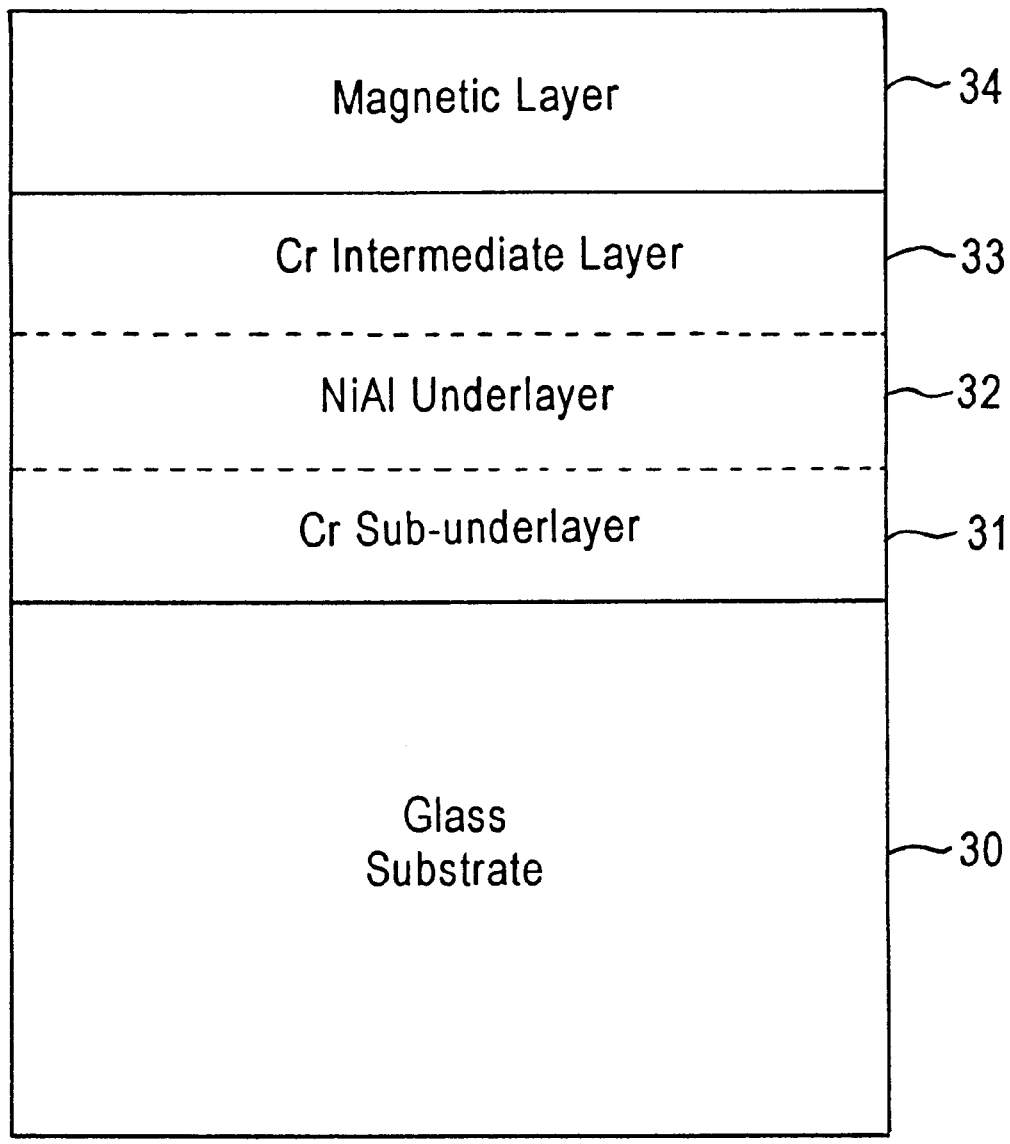
FIG. 3 schematically depicts a prior art magnetic recording medium comprising a composite NiAl/Cr underlayer structure.
Figure 4:
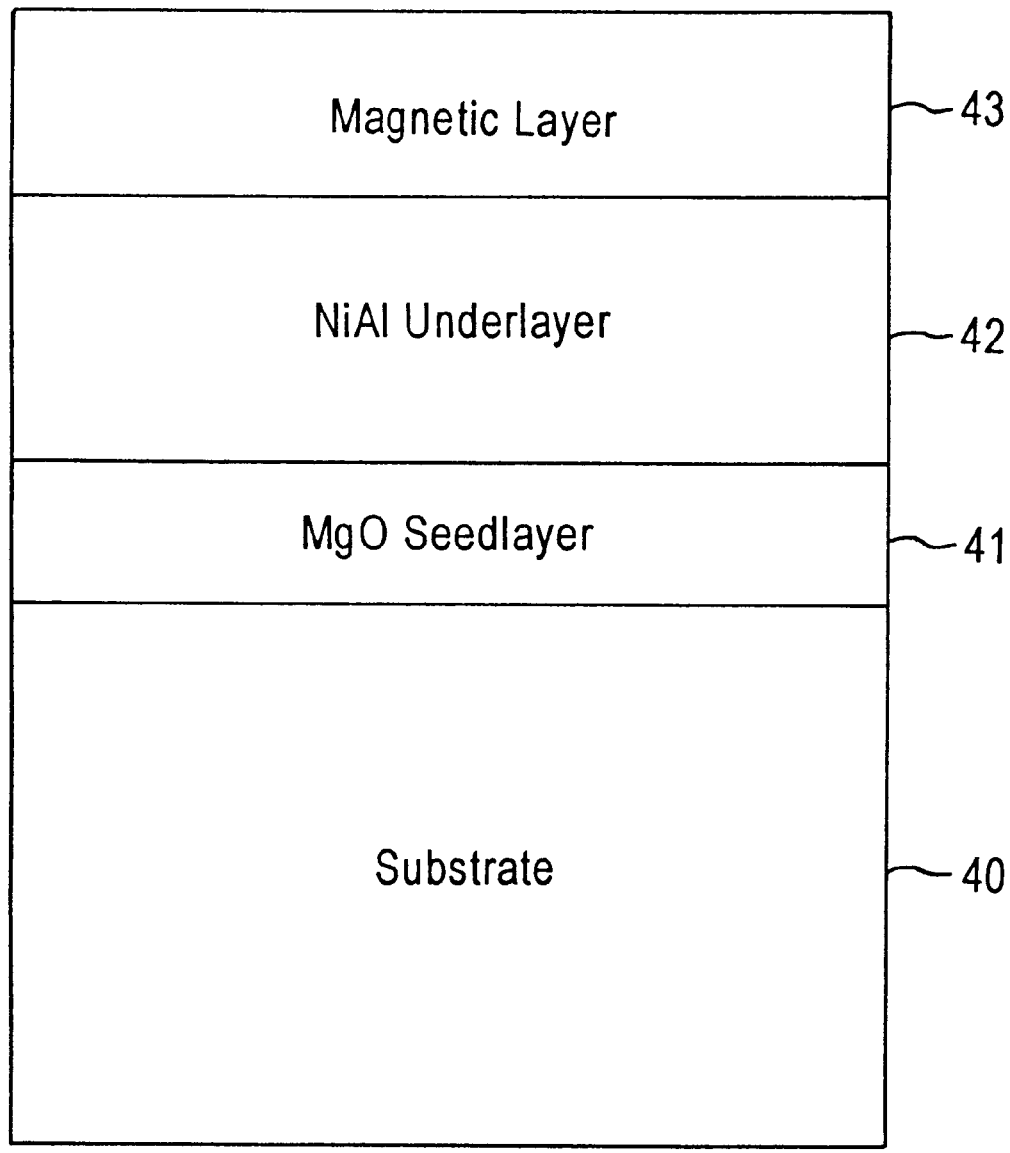
FIG. 4 schematically depicts a prior art magnetic recording medium comprising an NiAl underlayer and MgO seedlayer.

The present invention provides a magnetic recording medium suitable for high areal recording density exhibiting high $H_c$, high SNR and high S*. Magnetic recording media in accordance with embodiments of the present invention advantageously exhibit substantial directional magnetic isotropy.

A conventional technique for achieving high SNR involves high substrate heating temperatures. However, the use of high substrate heating temperatures disadvantageously destroys the underlayer texture which, in turn, decreases the crystalline orientation of the magnetic layer. Moreover, thermal stresses associated with high substrate heating temperatures negatively impact tribological characteristics of a disk surface. For example, high substrate heating temperatures induce microcracking on the disk surface, including the laser textured landing zone which may lead to head crashes.

Optimally, high density recording media require a low flying height to support high recording density. Thus, conventional textured substrates must be provided with supersmooth surfaces in order to achieve the requisite low flying height for high recording density. As used throughout this application, the term "supersmooth" denotes a polished surface typically having an average surface roughness Ra of no greater than 5 Å.

Conventional practices involve circumferentially texturing substrates to provide high $H_c$ and S* via anisotropic effects due to geometric anisotropy, thermal stress and the magnetorestriction effect. A typical NiP/Al substrate provided with a supersmooth substrate provides a significant challenge for media manufacturers. Specifically, any defect, such as a scratch, on a supersmooth NiP/Al substrate will induce local anisotropy, thereby causing undesirably high signal modulation during the read-write process. As a result, significant yield loss is encountered resulting in a higher manufacturing cost. It would be desirable and highly advantageous to provide a magnetic recording medium having an NiP/Al supersmooth substrate free from local anisotropy effects, as well as a textured substrate exhibiting substantial directional magnetic anisotropy.

Conventional practices involve the use of different materials as seedlayer, underlayer or bufferlayer designed for longitudinal magnetic recording media. An epitaxially grown magnetic layer exhibits a certain crystallographic structure resulting in certain magnetic properties. The choice of material and process parameters significantly impact media performance.

Conventional practices seek to control material selection and deposition conditions to obtain an underlayer exhibiting a (200) or (112)-dominant crystallographic orientation to induce a (11$\bar{2}$0) or (10$\bar{1}$0)-dominant crystallographic orientation in the magnetic layer deposited and epitaxially grown thereon. Thus, the preferred surface orientation of both the underlayer and magnetic layer of conventional longitudinal recording media results from the combined effects of substrate texturing, substrate heating prior to sputtering and variation of the underlayer material and deposition parameters. However, high density recording media require a reduction in texture, scratch and local physical and magnetic anisotropy, therefore reducing the modulation of the recording signal.

In accordance with the present invention, a NiAl underlayer is deposited on a NiP-plated non-magnetic metallic substrate, such as an aluminum (Al) or Al alloy substrate, such that a magnetic layer deposited thereon exhibits substantial directional magnetic isotropy inside the disc plane. Thus, in accordance with the present invention, the NiAl underlayer forms the B2 structure with a surface orientation plane being (112), the Cr underlayer will be epitaxially deposited on top of the NiAl film because its lattice constant of the BCC structure matches that of NiAl perfectly. As a consequence of lattice and crystalline plane matching, the magnetic layer will grow in a close-packed hexagonal structure with a (10$\bar{1}$0) crystallographic orientation which is isotropic inside the film surface. Therefore, the grains will have a (10$\bar{1}$0) orientation but substantially randomly distributed in the disc surface plane. As a result, the subsequently deposited magnetic layer exhibits a close-packed hexagonal structure with the magnetic easy axis, c-axis, lying in the film plane, but the axis is randomly distributed inside the film plane. Embodiments of the present invention include the formation of a magnetic recording medium wherein the magnetic properties have an orientation ratio (circumferential direction:radial direction) of about 1.0.

The formation of a magnetic layer exhibiting substantial two dimensional directional magnetic isotropy is advantageous in many respects. For example, a magnetic recording medium comprising a magnetic layer characterized by substantial directional magnetic isotropy exhibits significantly improved overwrite characteristics and significantly reduced magnetic property modulation, particularly reduced $H_c$ modulation in the circumferential direction. In addition, such substantial directional magnetic isotropy avoids any substantial nonlinear noise behavior at high recording densities.

The NiAl underlayer of the present invention can be represented by the formula:

$Ni_xAl_yA$; wherein x/y ranges from about 0.9 to about 1.1, and A is an optional alloying element selected for lattice matching with the subsequently deposited magnetic alloy layered to induce a preferred hexagonal closed pack crystal structure. Element A can be, for example, titanium, chromium, tungsten or zirconium.

In another embodiment of the present invention, a Cr-containing layer is deposited on the NiAl underlayer. The Cr-containing layer can also contain an alloying element selected for lattice matching with the subsequently deposited magnetic alloy to induce a preferred hexagonal closed pack crystal structure. Such an alloying element can be, for example, titanium, vanadium, molybdenum or zirconium. The Cr-containing layer similarly does exhibit a preferred crystallographic orientation, i.e., a (112)-dominant crystallographic orientation through the epitaxial growth.

Advantageously, the NiAl underlayer or Cr-containing layer can be sputter deposited in a conventional DC magnetron sputter apparatus. For example, the base pressure can be about $10^{-7}$ Torr, while the substrate can be heated in excess of 100° C. utilizing a sputtering pressure in the range of about 5 to about 15 mTorr.

The exact mechanism involved in depositing and epitaxially growing a magnetic layer exhibiting substantial two dimensional directional magnetic isotropy is not known with certainty. However, it is believed that the deposition of the NiAl underlayer directly on an NiP plated metallic substrate results in the NiAl underlayer having grains with dominant (112) orientation in a plane which are substantially randomly oriented. The subsequently deposited Cr-containing layers as well as magnetic layer, similarly, will have a dominant crystallographic orientation but randomly oriented inside the film plane.

Embodiments of the present invention include sputter depositing an NiAl underlayer having a thickness of about 100 Å to about 2,000 Å, e.g., about 200 Å to about 1,000 Å. In other embodiments of the present invention, a Cr-containing layer having a thickness of about 10 Å to about 1,000 Å is deposited on the NiAl underlayer. The present invention advantageously achieves a coercivity between 500 and 6,000 Oe, e.g., about 2,500 to about 4,000 Oe, particularly on supersmooth substrates. Advantageously, the present invention achieves an SNR at about 240 kiloflux change per inch (KFCI) of about 5 to about 40 dB, e.g., about 18 to about 25 dB. Advantageously, magnetic recording media in accordance with embodiments of the present invention do not exhibit any significant magnetic property modulation. For example, the maximum change in coercivity in both the circumferential and radial directions on the surface of the magnetic recording media is about 5 to about 300 Oe, and the maximum change in $M_rT$ ($M_r \times$ thickness) is about 0.005 to about 0.015 memu/cm$^2$.

The magnetic layer employed in the present invention can comprise any magnetic alloys conventionally employed in the manufacture of magnetic recording media, such as cobalt alloys containing chromium, platinum and tantalum, cobalt alloys containing chromium, tantalum and phosphorous, cobalt alloys containing chromium and tantalum or cobalt alloys containing chromium and phosphorous.

Figure 5:
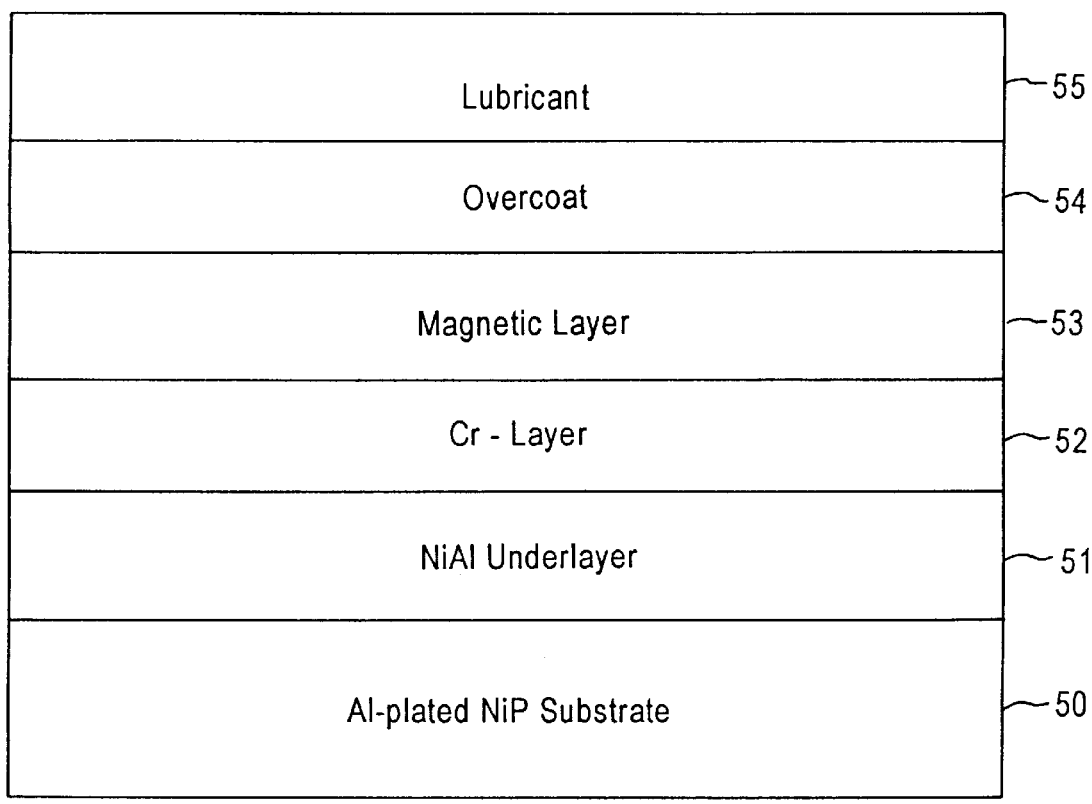
FIG. 5 schematically illustrates a magnetic recording medium in accordance with the present invention.

A magnetic recording medium produced in accordance with the present invention is schematically illustrated in FIG. 5 and comprises NiP plated Al substrate 50, NiAl underlayer 51, an optional Cr layer 52, magnetic layer 53, carbon-containing overcoat 54 and lubricant topcoat 55. As in conventional practices, the seedlayer, underlayer, magnetic layer and overcoat can be advantageously sputter-deposited employing a conventional sputtering system.

EXAMPLE

Sixteen magnetic recording media were made in accordance with the present invention employing an NiP-plated Al substrate having an NiAl underlayer thereon, a Cr layer on the NiAl underlayer, a magnetic layer containing cobalt, chromium, platinum, tantalum, and a C-containing protective overcoat thereon. Eight of the magnetic recording media comprised a supersmooth NiP-plated Al substrate, while the other eight comprised an NiP-plated Al substrate having a circumferential mechanical texture thereon with a maximum Ra of 6 Å. Apart from the supersmooth vis-à-vis mechanical texture of the NiP-plated Al substrate, all magnetic recording media were substantially the same and produced in substantially the same manner.

The magnetic properties of the 16 media were tested on a non-destructive rotating disk magnetometer. Samples were cut from the thin media and the coercivity was measured both at circumferential and radial directions of the disk sample using a vibrating sample magnetometer. The recording signal and media noise were measured at 240 KFCI linear density employing a Guzik tester with a magnetoresistive (MR) head which has a gap length of 0.5 µm and flies at a height of about 1.1 µinch. The results are reported in Table I.

TABLE I

| | textured substrates | | | | smooth substrates | | |
|---|---|---|---|---|---|---|---|
| sample# | $H_c$ (Oe) | S* | SNR (dB) | sample# | $H_c$ (Oe) | S* | SNR (dB) |
| 1 | 2786 | 0.828 | 19.0 | 1 | 2982 | 0.828 | 20.9 |
| 2 | 2910 | 0.837 | 18.9 | 2 | 3043 | 0.850 | 20.9 |
| 3 | 2767 | 0.828 | 19.4 | 3 | 2880 | 0.842 | 20.7 |
| 4 | 2849 | 0.839 | 19.4 | 4 | 2944 | 0.842 | 21.7 |
| 5 | 2883 | 0.857 | 19.5 | 5 | 3047 | 0.841 | 21.5 |
| 6 | 2892 | 0.856 | 19.6 | 6 | 2919 | 0.837 | 20.6 |
| 7 | 2778 | 0.836 | 19.2 | 7 | 2859 | 0.830 | 21.8 |
| 8 | 2821 | 0.847 | 19.9 | 8 | 2897 | 0.828 | 21.7 |

Figure 6A:
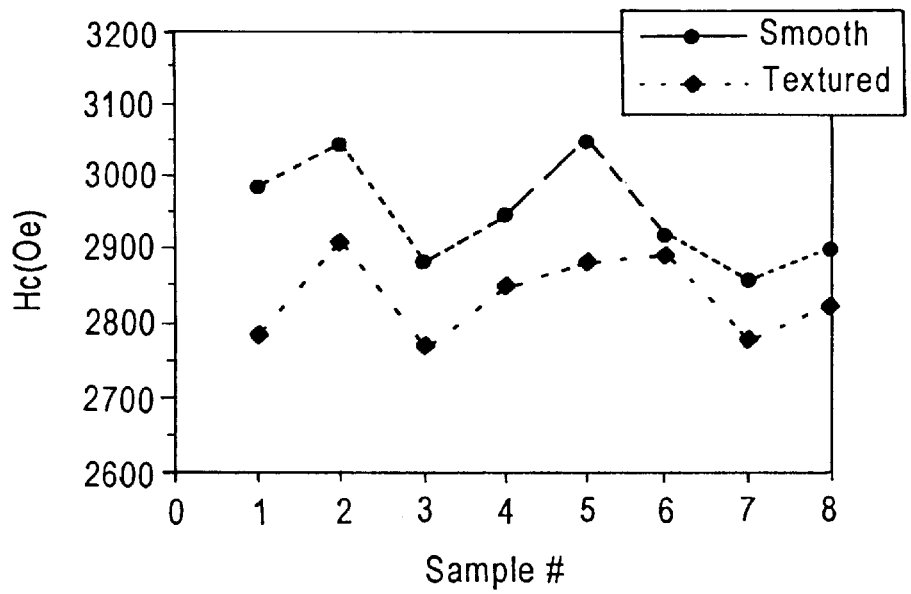
FIGS. 6A and 6B are graphs showing the $H_c$ and SNR of magnetic recording media in accordance with embodiments of the present invention.
Figure 6B:
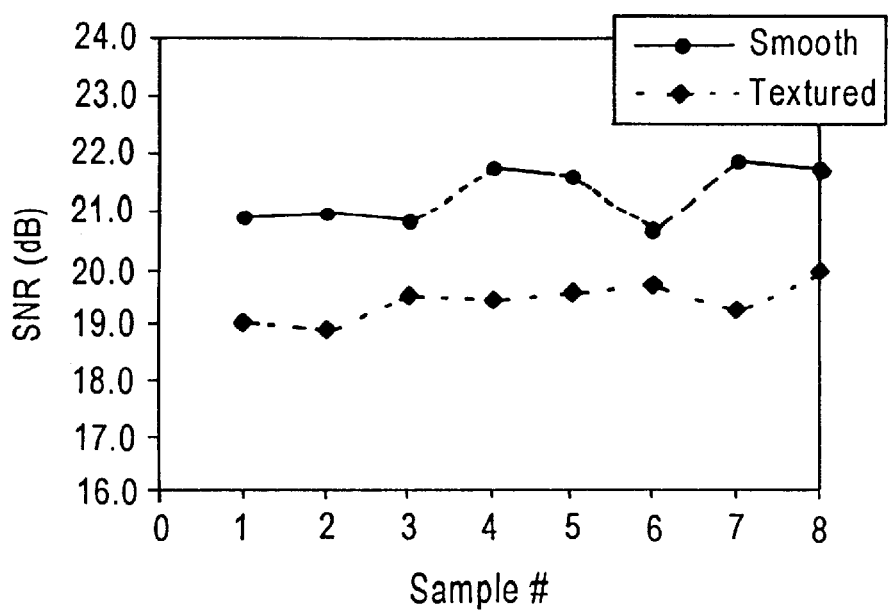

The measured data reported in Table I includes the magnetic properties $H_c$, S*, as well as SNR, with $M_rt$ values between 0.55 and 0.66 memu/c$^2$. The $H_c$ and SNR of the two sets of samples (supersmooth surface vis-à-vis circumferential mechanical texture) are plotted in the graphs shown in FIGS. 6A and 6B. The data reveal that the use of a supersmooth substrate results in a $H_c$ on the average of 100 Oe greater vis-à-vis mechanically textured substrates, while both $M_rt$ and S* were maintained at similar values. In addition, the SNR exhibited an average of 2 dB gain for supersmooth substrates.

It was surprisingly found that the orientation ratios for both types of media (supersmooth and textured) were both 1.0, indicating that there is no anisotropy on the textured disk and no magnetic modulation along the textured direction. With or without texturing, the magnetic recording media of the present invention exhibit two dimensional isotropic magnetic performance. Thus, the use of an NiAl underlayer in accordance with the present invention randomized any geometric anisotropy effect on the disk surface, including the circumferential mechanical texturing or radial scratches, as well as any anisotropy effect due to thermal stress or magnetorestriction, resulting in less signal modulation and less media noise in the magnetic film. Such magnetic recording media having substantial isotropic magnetic properties advantageously exhibit improved overwrite and are not characterized by the presence of any substantial non-linear noise behavior at high recording densities.

The desirable reduction in modulation is apparent from Table II which summarizes the fluctuations of magnetic properties for the same two groups of eight samples prepared on textured and smooth substrates. In addition, Samples 9 and 10 are disks with similar Hc and Mrt values but employing a Cr/CoCrPtTa/C film structure.

TABLE II

| textured substrates | | | smooth substrates | | |
|---|---|---|---|---|---|
| sample # | $dH_c$(Oe) | $dM_rt$(memu/cm$^2$) | sample # | $dH_c$(Oe) | $dM_rt$(memu/cm$^2$) |
| 1 | 94 | 0.045 | 1 | 51 | 0.037 |
| 2 | 101 | 0.028 | 2 | 41 | 0.031 |
| 3 | 78 | 0.042 | 3 | 42 | 0.039 |
| 4 | 77 | 0.027 | 4 | 38 | 0.028 |
| 5 | 68 | 0.054 | 5 | 31 | 0.023 |
| 6 | 70 | 0.028 | 6 | 34 | 0.038 |
| 7 | 53 | 0.043 | 7 | 32 | 0.040 |
| 8 | 49 | 0.025 | 8 | 34 | 0.027 |
| 9 | 96 | 0.048 | | | |
| 10 | 55 | 0.070 | | | |

The difference of maximum $H_c$ value and minimum $H_c$ value measured along the circumferential direction, and then averaged over five testing radii of the disk surface, is denoted by a $dH_c$. The measure of $M_rt$ fluctuation along the circumferential direction is denoted by $dM_rt$.

Further experimentation revealed that the $H_c$ can be fine tuned or tailored by varying the thickness of the NiAl underlayer and/or substrate temperature during deposition of the NiAl underlayer. In general, a coercivity of about 200 to about 500 Oe higher is achieved using a supersmooth substrate vis-à-vis a textured substrate, presumably due to better film uniformity and morphology.

All examples exhibited a significant reduction of $H_c$ modulation along the recording track direction for the supersmooth substrates vis-à-vis those sputtered on textured substrates. In general, the $M_rt$ fluctuation was decreased employing supersmooth substrates. The magnetic recording media produced in accordance with the present invention, therefore, are extremely suitable for high density recording and advantageously, can be manufactured using supersmooth substrates.

The magnetic recording media according to the present invention exhibit substantial directional magnetic isotropy regardless of whether the substrate is supersmooth or textured. Advantageously, the magnetic recording media in accordance with the present invention, exhibit high coercivity and high SNR, reduced modulation and are characterized by the substantial absence of non-linear noise behavior at high recording densities. The magnetic recording media in accordance with the present invention enjoy utility in various applications, particularly applications wherein high density is required, such as a magnetic rigid disk media for longitudinal recording.

The magnetic layer of the present invention can comprise any magnetic alloy conventionally employed in the production of magnetic recording media. Such alloys include, but are not limited to, Co-based alloys such as CoCr, CoCrTa, CoNiCr, CoCrPtTa, CoCrPt, CoNiPt, CoNiCrPt and CoCrPtB. The thickness of the magnetic layer is consistent with the thickness of magnetic layers of conventional magnetic recording media. A Co-base alloy having a thickness of about 10 Å to about 1000 Å, such as about 100 Å to 500 Å, has been found suitable.

As in conventional magnetic recording media, a protective overcoat can be deposited on the magnetic layer by any conventional means, such as sputtering. Protective overcoats can comprise zirconium oxide ($ZrO_2$), carbon, including hydrogenated carbon, silicon carbide (SiC), or a carbon nitride (CN). The protective overcoat is provided in a thickness suitable to protect the underlying layers. An overcoat having a thickness of about 10 Å to about 300 Å, such as about 50 Å to 200 Å has been found suitable.

As in conventional magnetic recording media, a layer of a lubricant can be applied on and bonded to the overcoat. The lubricant topcoat can be provided in any suitable thickness. A lubricant thickness of about 5 Å to 50 Å, such as about 10 Å to about 20 Å, has been found suitable.

Only certain embodiments of the invention and but a few examples of its versatility are shown and described in the present disclosure. It is to be understood that the invention is capable of use in various other combinations and environments and is capable of changes or modifications within the scope of the inventive concept as expressed herein.

What is claimed is:

1. A magnetic recording medium comprising:
   a non-magnetic substrate having a nickel-phosphorous plating thereon;
   a nickel-aluminum underlayer on the nickel-phosphorous plated nonmagnetic metallic substrate; and
   a magnetic layer on the underlayer; wherein the magnetic layer exhibits substantial directional magnetic isotropy in the medium surface plane.

2. The magnetic recording medium according to claim 1, having magnetic properties with an orientation ratio of about 1.

3. The magnetic recording medium according to claim 2, wherein the underlayer has a thickness of about 10 Å to about 2,000 Å.

4. The magnetic recording medium according to claim 1, wherein the underlayer is represented by the formula $Ni_xAl_yA$; wherein:
   Ni represents nickel;
   Al represents aluminum;
   x/y equals 0.9–1.1; and
   A is an optional alloying element which induces a hexagonal close packed crystal structure in the magnetic layer by lattice matching.

5. The magnetic recording medium according to claim 4, wherein A is titanium, chromium, tungsten or zirconium.

6. The magnetic recording medium according to claim 1, further comprising a chromium-containing layer on the nickel-aluminum underlayer, wherein the chromium-containing layer contains an optional alloying element for inducing a hexagonal close packed crystal structure in the magnetic layer by lattice matching.

7. The magnetic recording medium according to claim 6, wherein the optional alloying element is titanium, tantalum, vanadium or zirconium.

8. The magnetic recording medium according to claim 6, wherein:

the nickel-aluminum underlayer has a thickness of about 10 Å to about 2,000 Å; and the chromium-containing layer has a thickness of about 10 Å to about 1,000 Å.

9. The magnetic recording medium according to claim 6 having a surface plane, wherein the chromium-containing layer and the magnetic layer exhibit a dominant surface crystallographic orientation, the axial orientation of the c-axis being randomly distributed in the surface plane.

10. The magnetic recording medium according to claim 1 having a surface plane, wherein the nickel-aluminum underlayer and the magnetic layer exhibit a dominant surface crystallographic orientation, the axial orientation of the c-axis being randomly distributed in the surface plane.

11. The magnetic recording medium according to claim 6, exhibiting a coercivity of about 500 to about 6,000 Oe and a signal to noise ratio of about 5 to about 40 dB at 240 KFCI.

12. The magnetic recording medium according to claim 11, wherein:

the maximum change in coercivity in the circumferential and radial directions on the medium surface is about 5 to about 300 Oe; and the maximum change in Mrt in the circumferential and radial directions on the medium surface is about 0.005 to about 0.15.

13. The magnetic recording medium according to claim 1, wherein the nickel-plated substrate has a supersmooth surface.

14. The magnetic recording medium according to claim 13, exhibiting a coercivity of about 2,500 to about 4,000 Oe.

15. The magnetic recording medium according to claim 1, wherein the magnetic layer comprises a cobalt alloy containing chromium, platinum, tantalum and/or phosphorous.

16. A method of manufacturing a magnetic recording medium, which method comprises:

depositing a nickel-aluminum underlayer on a non-magnetic metallic substrate having a nickel-phosphorous plating thereon; and depositing and epitaxially growing a magnetic layer on the nickel-aluminum underlayer such that the magnetic layer exhibits substantial two dimensional directional magnetic isotropy.

17. The method according to claim 16, wherein the magnetic properties of the magnetic recording medium have an orientation ratio of about 1.0.

18. The method according to claim 16, further comprising depositing a chromium-containing layer on the nickel-aluminum underlayer, wherein the chromium-containing layer further contains an optional alloying element which induces a hexagonal close packed crystal structure in the magnetic layer by lattice matching.

19. The method according to claim 16, wherein the nickel-aluminum underlayer contains a optional alloying element which induces a hexagonal close packed crystallographic structure in the magnetic layer by lattice matching.

20. The method according to claim 17, comprising sputter depositing, by D.C. magnetron sputtering, the nickel-aluminum underlayer directly on the nickel phosphorous plated non-magnetic substrate, wherein:

the nickel aluminum underlayer and magnetic layer exhibit a dominant crystallographic orientation and a magnetic easy axis in the plane but randomly distributed.

21. The magnetic recording medium according to claim 6, wherein the nickel-aluminum underlayer has a (112) surface orientation plane.

22. A magnetic recording medium according to claim 21, wherein the magnetic layer exhibits a close-packed hexagonal structure comprising grains having a (10$\overline{1}$0) crystallographic orientation substantially randomly distributed in the medium surface plane.

23. The magnetic recording medium according to claim 1, wherein the nickel-aluminum underlayer is directly on the nickel-phosphorous plating.

* * * * *